United States Patent
Achatz et al.

(10) Patent No.: US 10,781,498 B2
(45) Date of Patent: Sep. 22, 2020

(54) COMBINED SYSTEM FOR PRODUCING STEEL AND METHOD FOR OPERATING THE COMBINED SYSTEM

(71) Applicant: Thyssenkrupp AG, Essen (DE)

(72) Inventors: Reinhold Achatz, Essen (DE); Jens Wagner, Frankfurt a.M. (DE); Markus Oles, Hattingen (DE); Peter Schmöle, Dortmund (DE); Ralph Kleinschmidt, Mülheim a.d.Ruhr (DE); Christoph Meißner, Dortmund (DE); Niels Bredemeyer, Waltrop (DE); Johannes Völkl, Kelkheim (DE)

(73) Assignee: THYSSENKRUPP AG, Essen (DE)

( * ) Notice: Subject to any disclaimer, the term of this patent is extended or adjusted under 35 U.S.C. 154(b) by 237 days.

(21) Appl. No.: 15/102,485

(22) PCT Filed: Dec. 11, 2014

(86) PCT No.: PCT/EP2014/003318
§ 371 (c)(1),
(2) Date: Jun. 7, 2016

(87) PCT Pub. No.: WO2015/086152
PCT Pub. Date: Jun. 18, 2015

(65) Prior Publication Data
US 2016/0319383 A1    Nov. 3, 2016

(30) Foreign Application Priority Data

Dec. 12, 2013   (DE) .................. 10 2013 113 950

(51) Int. Cl.
*C21C 5/28*     (2006.01)
*C21B 5/06*     (2006.01)
(Continued)

(52) U.S. Cl.
CPC ............. *C21C 5/285* (2013.01); *C21B 5/06* (2013.01); *C21B 7/002* (2013.01); *C21C 5/40* (2013.01);
(Continued)

(58) Field of Classification Search
CPC ....... C21B 5/06; C21B 7/002; C21B 2100/02; C21B 2100/04; C21B 2100/06;
(Continued)

(56) References Cited

U.S. PATENT DOCUMENTS 5,454,853 A * 10/1995 Edelson ................... C21C 5/52
                                                                75/10.34
2002/0047230 A1 * 4/2002 Okada ...................... B01J 8/008
                                                                266/44

(Continued)

FOREIGN PATENT DOCUMENTS

CN         1311825 A     9/2001
CN       203159651 U     8/2013
(Continued)

OTHER PUBLICATIONS

ESPACENET family data for US 2015232999 A1 (Year: 2015).*

(Continued)

*Primary Examiner* — Tima M. McGuthry-Banks
(74) *Attorney, Agent, or Firm* — Avant Law Group, LLC

(57) ABSTRACT

The invention relates to a plant complex for steel production comprising a blast furnace for producing pig iron, a converter steel mill for producing crude steel and a gas-conducting system for gases that occur when producing the pig iron and/or producing the crude steel. According to the invention, the plant complex additionally has a chemical plant or biotechnological plant, connected to the gas-conducting system, and also energy storage for covering at least part of the electricity demand of the plant complex. Also the
(Continued)

subject of the invention is a method for operating the plant complex.

10 Claims, 2 Drawing Sheets

(51) Int. Cl.
  *C21B 7/00* (2006.01)
  *C21C 5/40* (2006.01)
  *C25B 1/04* (2006.01)
  *F27D 17/00* (2006.01)
  *C21B 5/00* (2006.01)
(52) U.S. Cl.
  CPC .............. *C25B 1/04* (2013.01); *F27D 17/001* (2013.01); *F27D 17/004* (2013.01); *C21B 2005/005* (2013.01); *C21B 2100/60* (2017.05); *C21B 2100/62* (2017.05); *C21B 2300/02* (2013.01); *F27M 2001/02* (2013.01); *H01M 2220/10* (2013.01); *Y02E 50/17* (2013.01); *Y02E 60/366* (2013.01); *Y02P 10/143* (2015.11); *Y02P 10/283* (2015.11); *Y02P 20/133* (2015.11)
(58) Field of Classification Search
  CPC ............ C21B 2100/60; C21B 2100/62; C21B 2100/80; C21C 5/285; C21C 5/40; C21C 2100/02; C21C 2100/04; C21C 2100/06; C25B 1/04; F27D 17/001; F27D 17/004; Y02P 10/143; Y02P 10/283; Y02E 60/366
  See application file for complete search history.

(56) References Cited

U.S. PATENT DOCUMENTS

| | | | |
|---|---|---|---|
| 2006/0027043 A1 | 2/2006 | Zendejas-Martinez | |
| 2007/0298478 A1* | 12/2007 | Offerman | C12P 5/023 435/167 |
| 2012/0226080 A1 | 9/2012 | Meyer-Pittroff | |
| 2014/0130639 A1* | 5/2014 | Baldauf | C21B 5/06 75/392 |
| 2014/0343339 A1* | 11/2014 | Schodel | C07C 41/01 585/639 |
| 2015/0232999 A1* | 8/2015 | Busskamp | C10G 2/50 518/704 |
| 2016/0319383 A1 | 11/2016 | Achatz | |

FOREIGN PATENT DOCUMENTS

| | | | | |
|---|---|---|---|---|
| DE | 102011077819 A1 | 12/2012 | | |
| DE | 102012216090 A1 * | 3/2014 | ............. | C10K 1/005 |
| DE | 102013113913 A1 | 6/2015 | | |
| DE | 102013113921 A1 | 6/2015 | | |
| DE | 102013113942 A1 | 6/2015 | | |
| DE | 102013113950 A1 | 6/2015 | | |
| DE | 102013113958 A1 | 6/2015 | | |
| DE | 102013113980 A1 | 6/2015 | | |
| EP | 200880 A2 | 11/1986 | | |
| EP | 244551 A1 | 3/1990 | | |
| EP | 2543743 A1 | 1/2013 | | |
| EP | 2657215 A1 | 10/2013 | | |
| EP | 3080310 A1 | 10/2016 | | |
| FR | 2420568 A1 | 10/1979 | | |
| JP | 61275101 A | 12/1986 | | |
| JP | 8026384 B2 | 10/1990 | | |
| JP | 2011225969 A | 11/2011 | | |
| KR | 10-2013-0001893 A | 7/2013 | | |
| KR | 10-2013-0076645 A | 8/2013 | | |
| RU | 2353659 C2 | 4/2009 | | |
| WO | 0005421 A1 | 2/2000 | | |
| WO | 2010136313 A1 | 12/2010 | | |
| WO | 2011018124 A1 | 2/2011 | | |
| WO | 2011026940 A1 | 3/2011 | | |
| WO | WO-2011026940 A1 * | 3/2011 | ............. | C21B 7/002 |
| WO | 2011116141 A2 | 9/2011 | | |
| WO | WO-2011116141 A2 * | 9/2011 | ............. | B82Y 30/00 |
| WO | 2012145910 A1 | 11/2012 | | |
| WO | WO-2014040844 A1 * | 3/2014 | ............. | C10K 1/005 |
| WO | 2015086148 A1 | 6/2015 | | |
| WO | 2015086149 A1 | 6/2015 | | |
| WO | 2015086150 A1 | 6/2015 | | |
| WO | 2015086151 A1 | 6/2015 | | |
| WO | 2015086152 A1 | 6/2015 | | |
| WO | 2015086153 A1 | 6/2015 | | |
| WO | 2015086154 A1 | 6/2015 | | |

OTHER PUBLICATIONS

PCT Application No. PCT/EP2014/003318 International Search Report dated Jun. 18, 2015, 9 pages.
PCT Application No. PCT/EP2014/003318 Written Opinion dated Jun. 18, 2015, 11 pages.
Canadian Application No. 2,930,469, Office Action dated Mar. 8, 2017, 4 pages.
Roshina S.I. et al. Operation, Repair and Maintenance of Buildings and Structures, Textbook, Vladimir, Publishing House VIGU, 2005, 108 pages.
Schmole et al., Ecological Hot Metal Production Using Coke Plant and Blast Furnace Route, La Revue de Metallurgie-CIT, Mar. 1, 2005, pp. 171-182, Bd. 102, Nr. 3, 1, XP001230940, Paris, FR.
Liotech Company's News, Golden Energy Costs in the Iron and Steel Industry, http://www.liotech.ru/nws, dated Apr. 26, 2012, 2 pages.
Zhang et al., "Recovery and Utilization of By-Product Gases in Iron and Steel Works", Iron and Steel,vol. 44, No. 12, Dec. 2009, pp. 95-99.
U.S. Appl. No. 15/102,142 Final Office Action dated Jan. 24, 2019.
Hamid Ghanbarl, Henrik Saxen, Ignacio E. Grossmann, Optimal Design and Operation of a Steel Plant Integrated with a Polygeneration System, AIChE Journal, Apr. 19, 2013 (published online), 3659-3670, vol. 59, No. 10.
H. Ibrahim, A. Ilinca, J. Perron, Energy storage systems—Characteristics and comparison, Renewable & Sustainable Energy Reviews, 2008, 1221-1250, vol. 12.
English translation of Office Action dated Jun. 29, 2020 received in related KR application No. 10-2016-7015193.

* cited by examiner

COMBINED SYSTEM FOR PRODUCING STEEL AND METHOD FOR OPERATING THE COMBINED SYSTEM

CROSS-REFERENCE TO RELATED APPLICATIONS

This application is the national phase of, and claims priority to, International Patent Application No. PCT/EP2014/003318, filed Dec. 11, 2014, which designated the U.S. and which claims priority to German Patent Application Number DE 10 2013 113 950.7, filed Dec. 12, 2013. These applications are each incorporated by reference herein in their entireties.

BACKGROUND

1. Field of the Invention

The invention relates to a plant complex for steel production and to a method for operating the plant complex.

2. Description of the Related Art

Pig iron is obtained in the blast furnace from iron ores, additives and also coke and other reducing agents such as coal, oil, gas, biomasses, recycled waste plastics or other substances containing carbon and/or hydrogen. CO, $CO_2$, hydrogen and water vapour inevitably occur as products of the reduction reactions. Apart from the aforementioned constituents, a blast-furnace top gas drawn off from the blast-furnace process often has a high content of nitrogen. The amount of gas and the composition of the blast-furnace top gas are dependent on the feedstock and the operating mode and are subject to fluctuations. Typically, however, blast-furnace top gas contains 35 to 60% by volume $N_2$, 20 to 30% by volume CO, 20 to 30% by volume $CO_2$ and 2 to 15% by volume $H_2$. Around 30 to 40% of the blast-furnace top gas produced in the production of the pig iron is generally used for heating up the hot air for the blast-furnace process in air heaters; the remaining amount of top gas may be used externally in other areas of the mill for heating purposes or for producing electricity.

In the converter steel mill, which is arranged downstream of the blast-furnace process, pig iron is converted into crude steel. By blowing oxygen onto liquid pig iron, troublesome impurities such as carbon, silicon, sulphur and phosphorus are removed. Since the oxidation processes cause an intense development of heat, scrap is often added in amounts of up to 25% with respect to the pig iron as a coolant. Furthermore, lime is added for forming slag and an alloying agent. A converter gas that has a high content of CO and also contains nitrogen, hydrogen and $CO_2$ is drawn off from the steel converter. A typical converter gas composition has 50 to 70% by volume CO, 10 to 20% by volume $N_2$, about 15% by volume $CO_2$ and about 2% by volume $H_2$. The converter gas is either burned off or, in the case of modern steel mill, captured and passed on to be used for providing energy.

The plant complex may optionally be operated in combination with a coking plant. In this case, the plant complex described at the beginning additionally comprises a coke-oven plant, in which coal is converted into coke by a coking process. In the coking of coal into coke, a coke-oven gas occurs, containing a high hydrogen content and considerable amounts of $CH_4$. Typically, coke-oven gas contains 55 to 70% by volume $H_2$, 20 to 30% by volume $CH_4$, about 10% by volume $N_2$ and 5 to 10% by volume CO. In addition, the coke-oven gas has fractions of $CO_2$, $NH_3$ and $H_2S$. In practice, the coke-oven gas is used in various areas of the mill for heating purposes and in the power-generating process for electricity generation. In addition, it is known to use coke-oven gas together with blast-furnace top gas or with converter gas for producing syngases. According to a method known from WO 2010/136313 A1, coke-oven gas is separated into a hydrogen-rich gas stream and a residual gas stream containing $CH_4$ and CO, the residual gas stream being fed to the blast-furnace process and the hydrogen-rich gas stream being mixed with blast-furnace top gas and processed further into a syngas. It is known from EP 0 200 880 A2 to mix converter gas and coke-oven gas and use them as a syngas for methanol synthesis.

In an integrated metallurgical plant that is operated in combination with a coking plant, approximately 40 to 50% of the raw gases that occur as blast-furnace top gas, converter gas and coke-oven gas are used for chemical engineering processes. Approximately 50 to 60% of the gases produced are fed to a power-generating plant and used for electricity generation. The electricity produced in the power-generating plant covers the electricity demand for the production of pig iron and crude steel. Ideally, the energy balance is closed, so that, apart from iron ores and carbon in the form of coal and coke as sources of energy, no further energy input is necessary and, apart from crude steel and slag, no product leaves the plant complex.

SUMMARY

One object of the invention includes further improving the cost-effectiveness of the overall process and providing a plant complex with which it is possible to reduce the costs for steel production. It is also endeavoured to reduce the $CO_2$ emissions in the production of crude steel.

WRITTEN DESCRIPTION

Figure 1:
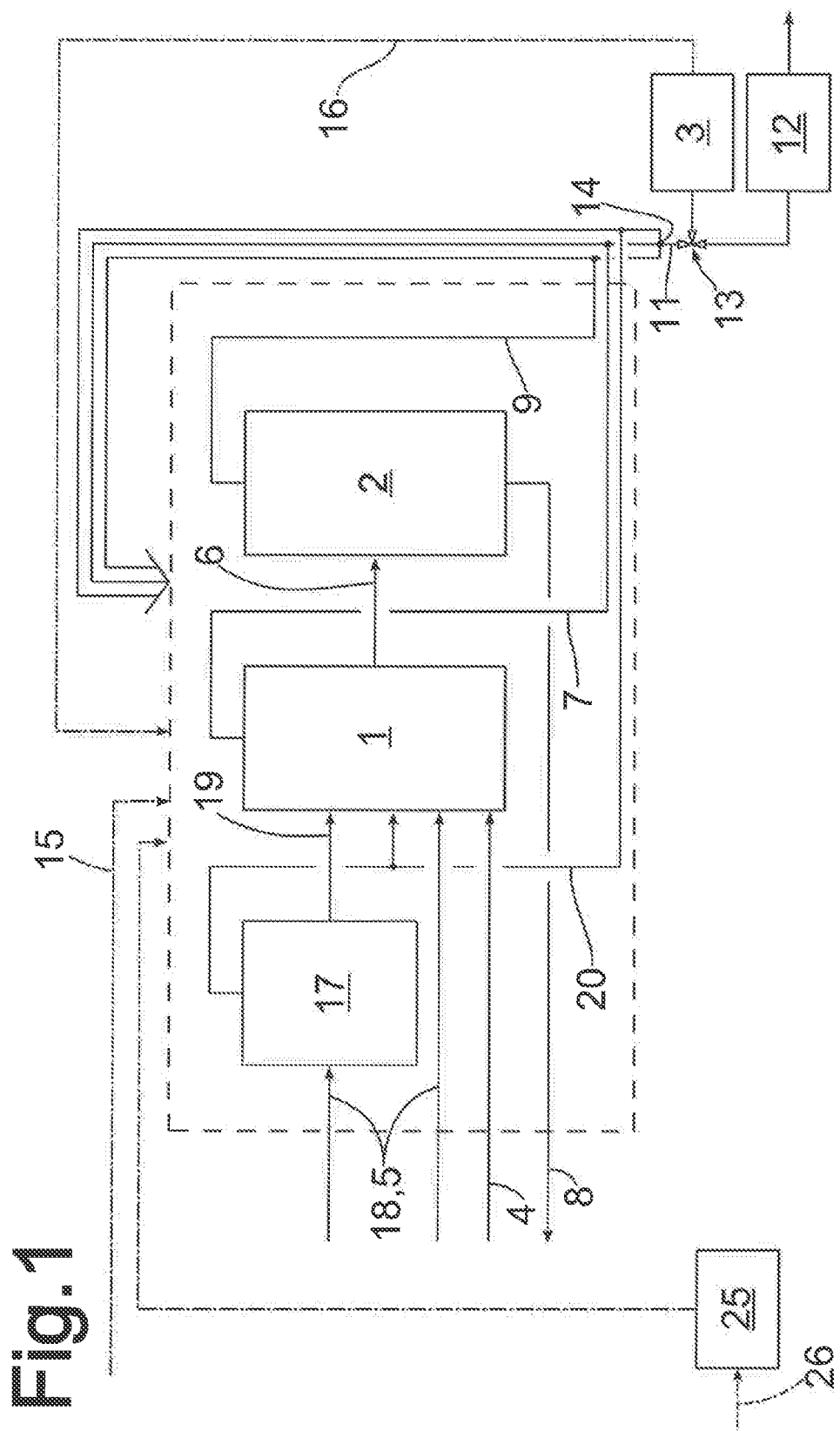
FIG. 1 shows a simplified block diagram of a plant complex for steel production comprising a blast furnace for producing pig iron, a converter steel mill for producing crude steel, a coke-oven plant for producing coke, an energy storage, a power-generating plant and a chemical plant.

The plant complex for steel production comprises at least one blast furnace for producing pig iron, a converter steel mill for producing crude steel and a gas-conducting system for gases that occur in the production of pig iron and/or in the production of crude steel. The plant complex may also have a power-generating plant for electricity generation, which is designed as a gas-turbine power-generating plant or gas-turbine and steam-turbine power-generating plant and is operated with a gas which comprises at least a partial amount of the blast-furnace top gas that occurs in the production of pig iron in the blast furnace and/or a partial amount of the converter gas that occurs in the converter steel mill.

Proceeding from a plant complex for steel production comprising a blast furnace for producing pig iron, a converter steel mill for producing crude steel and a gas-conducting system for gases that occur in the production of pig iron and/or the production of crude steel, it is provided according to the invention that the plant complex additionally has a chemical plant or biotechnological plant, connected to the gas-conducting system, and also an energy storage for covering at least part of the electricity demand of the plant complex.

Also the subject of the invention is a method for operating a plant complex for steel production that has at least one blast furnace for producing pig iron, a converter steel mill and a chemical plant or biotechnological plant. According to the method according to one embodiment the invention, initially a partial amount of a blast-furnace top gas that occurs in the production of pig iron in the blast furnace and/or a partial amount of a converter gas that occurs in the production of crude steel is used after a gas-conditioning operation as useful gas for producing chemical products or is fed after a gas-conditioning operation to the biotechnological plant and used for biochemical processes. In order to cover at least part of the electricity demand of the plant complex, energy storage is provided. The energy storage is fed with electricity that has been produced at least partially from renewable energy and the stored energy is given off again at a later time to electrical loads of the plant complex.

The provision of electricity from renewable energy, for example from solar plants or wind turbine generator plants, is subject to fluctuations over time. At times in which electricity from renewable energy is obtainable in a sufficient amount and at favourable prices, the energy storage is charged, so that when there is a shortfall in the provision of electricity and at times of high electricity prices, sufficient electricity can be taken from the energy storage to operate the plant complex. The integration of the energy storage in the plant complex makes it possible to have consistent production of pig iron and crude steel and also continuous operation of the chemical plant or biotechnological plant that is operated in combination with plants for producing pig iron and producing crude steel. It can be ensured by the plant complex according to the invention that a substantially uniform gas flow, which occurs in the production of pig iron and/or production of crude steel, is available to the chemical plant or biotechnological plant as a feed. In comparison with the prior art, in which 50 to 60% of the raw gases occurring as blast-furnace top gas, converter gas and possibly coke-oven gas, is used in a power-generating plant for electricity generation, the $CO_2$ emission can be reduced by the method according to the invention if the gases are not burned but are converted into products of higher value by chemical reactions or biochemical processes. The ecological benefit is all the greater the more electricity from renewable energy is used for feeding the energy storage and for supplying the electrical loads. The invention thereby also makes use of the fact that the efficiency of a chemical plant in which the gases that occur in the production of pig iron and/or production of crude steel are converted into chemical products is much greater than the efficiency of a power-generating process in which the raw gases are used for electricity generation.

A power-generating plant for supplying electricity to the plant complex may be used as a standby power-generating plant, in order to ensure a supply of electricity to the plant complex when the chemical plant or biotechnological plant is not in operation or the stored energy is not sufficient to operate the production plants for producing pig iron and producing crude steel with the desired output.

In the chemical plant, chemical products can be produced from syngases that respectively contain the components of the end product. Chemical products may be for example ammonia or methanol or else other hydrocarbon compounds.

For producing ammonia, a syngas that contains nitrogen and hydrogen in the correct ratio must be provided. The nitrogen can be obtained from blast-furnace top gas. Blast-furnace top gas or converter gas may be used as the hydrogen source, hydrogen being produced by conversion of the CO fraction by a water-gas-shift reaction ($CO+H_2O \rightleftharpoons CO_2+H_2$). For producing hydrocarbon compounds, for example methanol, it is necessary to provide a syngas consisting substantially of CO and/or carbon dioxide and $H_2$ that contains the components carbon monoxide and/or carbon dioxide and hydrogen in the correct ratio. The ratio is often described by the module $(H_2-CO_2)/(CO+CO_2)$. The hydrogen may be produced for example by conversion of the CO fraction in the blast-furnace top gas by a water-gas-shift reaction. Converter gas may be used for providing CO. Blast-furnace top gas and/or converter gas may serve as sources of $CO_2$.

In the case of the concepts described above, however, the C content or N content of the mixed gas cannot be used completely, since there is a hydrogen deficit. In order to be able to use the C content or N content of the gases that occur in the production of pig iron and/or the production of crude steel completely for the production of chemical products, according to a further refinement of the method according to one embodiment of the invention, hydrogen that is formed in a plant for producing hydrogen is provided. The production of hydrogen preferably takes place by electrolysis of water, it being possible for the electrolysis of water to be operated with electrical power from regenerative sources. Preferably, the electrolysis plant is electrically connected to the energy storage and at least part of the electrical energy necessary for the electrolysis of water is taken from the energy storage. Oxygen is also produced in the electrolysis of water, and can be used in the blast furnace for producing pig iron and/or in the converter steel mill for producing crude steel.

Within the scope of the invention, a biotechnological plant may also be used instead of a chemical plant for producing products from syngas. The plant concerned is a plant for the fermentation of syngas. The syngas is used biochemically by way of a fermentation process, it being possible to produce products such as alcohols (ethanol, butanol), acetone or organic acids. These products, which are produced by fermentation of syngas, are only mentioned by way of example in the present case.

The plant complex may additionally have a coke-oven plant. If the production of pig iron and the production of crude steel are operated in combination with a coking plant, a partial amount of the blast-furnace top gas that occurs in the production of pig iron and/or a partial amount of the converter gas that occurs in the converter steel mill may be mixed with a partial amount of the coke-oven gas that occurs in the coke-oven plant and the mixed gas may be used as a useful gas. A mixture of coke-oven gas and blast-furnace top gas or a mixed gas comprising coke-oven gas, converter gas and blast-furnace top gas may be used as a useful gas for producing a syngas, for example for ammonia synthesis. A mixed gas comprising coke-oven gas and converter gas or a mixed gas comprising coke-oven gas, converter gas and blast-furnace top gas is suitable for producing hydrocarbon compounds. The described chemical products that can be produced in a chemical plant from blast-furnace top gas, converter gas and coke-oven gas are only application examples for explaining the variants of the method that are described in the patent claims.

The raw gases—coke-oven gas, converter gas and/or blast-furnace top gas—may be conditioned individually or in combinations as a mixed gas and then fed to the chemical plant as syngas. The conditioning of coke-oven gas in particular comprises a cleaning of the gas to separate out troublesome contents, in particular tar, sulphur and sulphur compounds, aromatic hydrocarbons (BTX) and high-boiling hydrocarbons. A gas-conditioning operation is also necessary for producing the syngas. In the course of the gas conditioning, the proportion of the components CO, $CO_2$ and $H_2$ within the raw gas is changed. The gas conditioning comprises for example pressure swing adsorption for separating out and enriching $H_2$ and/or a water-gas-shift reaction for converting CO into hydrogen and/or a steam reformer for converting the $CH_4$ fraction into CO and hydrogen in the coke-oven gas.

The energy storage may be operated in an electrical network with a power-generating plant that is designed as a gas-turbine power generating plant or gas-turbine and steam-turbine power-generating plant and for purposes of electricity generation is operated with blast-furnace top gas, converter gas or coke-oven gas or a mixed gas formed from at least two of these gas components. The power-generating plant and the chemical or biotechnological plant are arranged in parallel with respect to the feeding of gas. The streams of gas fed on the one hand to the power-generating plant and on the other hand to the chemical or biotechnological plant are controllable.

The invention also covers the use of an electrochemical or chemical energy storage for integration in a plant complex for steel production.

The plant complex for steel production that is represented in FIG. 1 comprises a blast furnace 1 for producing pig iron, a converter steel mill 2 for producing crude steel and optionally a coke-oven plant 17 for producing coke 19 that is required for producing pig iron. A power-generating plant 3 may also be provided, designed as a gas-turbine power-generating plant or gas-turbine and steam-turbine power-generating plant and operated with a gas that occurs in the production of pig iron, the production of crude steel and/or in the coke-oven plant. A gas-conducting system is provided for carrying the gases.

In the blast furnace 1, pig iron 6 is obtained substantially from iron ore 4 and reducing agents 5, in particular coke and coal. Reduction reactions cause the production of a blast-furnace top gas 7, which contains nitrogen, CO, $CO_2$ and $H_2$ as the main constituents. In the converter steel mill 2 that is arranged downstream of the blast-furnace process, pig iron 6 is converted into crude steel 8. By blowing oxygen onto the liquid pig iron, troublesome impurities, in particular carbon, silicon and phosphorus, are removed. For cooling, scrap may be added in amounts of up to 25% with respect to the amount of pig iron. Furthermore, lime is added for forming slag and an alloying agent. At the top of the converter, a converter gas 9 that has a very high proportion of CO is drawn off. If the plant complex additionally comprises a coke-oven plant 17, a coke-oven gas 20, containing a high proportion of hydrogen and $CH_4$, also occurs as a result of coking of coal 18 into coke 19. Parts of the coke-oven gas 20 may be used for the heating of air heaters in the blast furnace 1.

According to the overall balance represented in FIG. 1, carbon is fed to the plant complex as a reducing agent 5 in the form of coal and coke and also iron ore 4. Occurring as products are crude steel 8 and raw gases 7, 9, which differ in amount, composition, calorific value and purity and are used again at various points in the plant complex. In an overall consideration, 40 to 50%, usually approximately 45%, of the raw gases 7, 9 are returned again into the metallurgical process for producing pig iron or producing crude steel. Between 50 and 60%, usually approximately 55%, of the raw gases 7, 9 is fed to the chemical plant 12 or can be used for operating the power-generating plant 3. Instead of the chemical plant 12, a biotechnological plant may also be provided.

The chemical plant 12 or biotechnological plant is connected to the gas-conducting system and is arranged in parallel with the power-generating plant 3 with respect to the gas supply. The gas-conducting system has an operationally controllable gas diverter 13 for dividing the streams of gas that are fed to the power-generating plant 3 and the chemical plant 12 or biotechnological plant. Provided upstream of the gas diverter 13 in the direction of flow is a mixing device 14, for producing a mixed gas 11 consisting of blast-furnace top gas 7, converter gas 9 and/or coke-oven gas 20.

In the case of the plant complex represented in FIG. 1, at least a partial amount of the raw gas that occurs in the plant complex as blast-furnace top gas, converter gas and possibly coke-oven gas is used after a gas-conditioning operation as useful gas for producing chemical products. Externally obtained electricity 15, which is at least partially obtained from renewable energy and originates for example from wind turbine generator plants, solar plants, hydroelectric power-generating plants and the like, is used to cover the electricity demand of the plant complex. In addition, power-generating plant electricity 16 may be used.

The plant complex comprises energy storage 25. The energy storage is fed with electricity 26 that has been produced at least partially from renewable energy and the stored energy is given off again at a later time to electrical loads of the plant complex. The energy storage 25 is also operated in an electrical network with the power-generating plant 3. To achieve continuous operation of the plants for producing pig iron and producing crude steel and the chemical plant 12, mixed gas must be continuously available as a feed for the chemical plant 12. In order that, in return, the plant complex always has the amount of electricity required for producing pig iron and producing crude steel available, at times of low electricity prices and sufficient availability of renewable energy electrical energy is stored in the energy storage 25. If the renewable energy is not externally available in a sufficient amount at acceptable prices, the required electricity is taken from the energy storage 25. The plant complex with the inclusion of the power-generating plant 3 is designed in such a way that the power-generating plant 3 can be used in standby mode and at least at certain times is switched off. The power-generating plant 3 is used whenever the chemical plant 12 is out of operation or the stored energy is not sufficient to ensure the operation of the plant complex. In this case, the plant complex is at least partially operated with power-generating plant electricity 16. This prevents the chemical plant 12 from having to be operated in part-load mode or reduced right down in its output. The energy storage 25 is formed as a chemical or electrochemical store. The same applies correspondingly if a biotechnological plant is used instead of the chemical plant 12.

Figure 2:
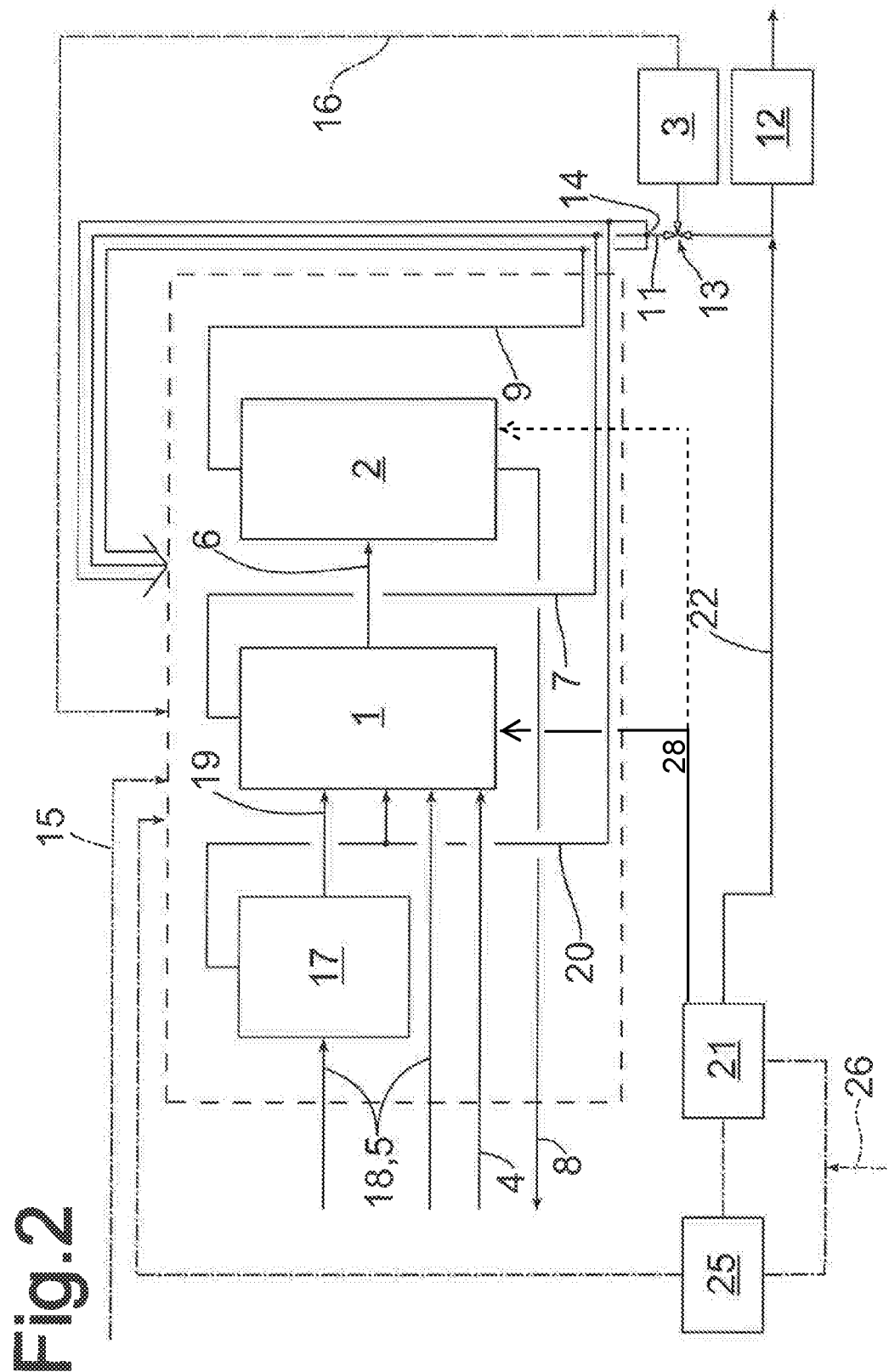
FIG. 2 shows a simplified block diagram of a plant complex which has in addition to the plant components represented in FIG. 1 a plant for producing hydrogen.

In the exemplary embodiment of FIG. 2, the plant complex additionally comprises a plant 21 for producing hydrogen, which is connected to the gas-conducting system by a hydrogen-carrying line 22. The plant 21 for producing hydrogen may be in particular an electrolysis plant for the electrolysis of water. Electrolysis of water is energy-intensive to operate. At least part of the electrical energy necessary for the electrolysis of water is taken from the energy storage 25. In addition, external electricity 26, which preferably originates from regenerative sources, may be used. The hydrogen produced by electrolysis of water is fed to the chemical plant 12 together with the useful gas as syngas.

This allows the capacity of the chemical plant 12 to be increased significantly. The same applies correspondingly if a biotechnological plant is provided instead of the chemical plant 12.

The blast-furnace top gas 7, the converter gas 9 and the coke-oven gas 20 may be combined with one another in any way desired. The combination of gas streams 7, 9, 20 depends on the desired syngas or the product that is to be produced in the chemical plant 12 or the biotechnological plant from the syngas.

The invention claimed is:

1. A plant complex for steel production comprising: a blast furnace for producing pig iron;
a converter steel mill for producing crude steel; and
a gas-conducting system for gases that occur in at least one of the production of pig iron and crude steel;
wherein:
the plant complex additionally comprises:
a biotechnological plant connected to the gas-conducting system;
chemical or electrochemical energy storage for storing electricity, wherein the stored electricity covers at least part of the electricity demand of the plant complex;
a power-generating plant operably connected to the gas-conducting system; and
an electrolysis plant for the electrolysis of water, the electrolysis plant:
being connected to the biotechnological plant by a hydrogen line; and
being connected to at least one of the blast furnace and the converter steel mill for producing crude steel and treating crude steel by means of an oxygen return device;
wherein:
the biotechnological plant produces alcohol, acetone, or organic acids by a fermentation of a syngas;
the syngas consists of a hydrogen gas produced by the electrolysis plant, a blast furnace gas from the blast furnace, a converter gas from the converter steel mill, and a coke oven gas;
the biotechnological plant is arranged in parallel with the power-generating plant with respect to the syngas; and
for the purpose of supplying electricity to the electrolysis plant, the energy storage is electrically connected thereto.

2. The plant complex according to claim 1, wherein the power-generating plant is designed as a gas-turbine power-generating plant or a gas-turbine and steam-turbine power-generating plant and is operated with a gas which comprises at least a partial amount of one of: the blast-furnace top gas that occurs in the production of pig iron in the blast furnace, and the converter gas that occurs in the converter steel works; and wherein the gas-conducting system has a switchable gas diverter for dividing the streams of gas that are fed to the power-generating plant and the biotechnological plant.

3. The plant complex according to claim 2, wherein oxygen that occurs in the electrolysis of water is used in at least one of the blast furnace for producing pig iron and the converter steel mill for producing crude steel.

4. The plant complex according to claim 3, wherein 5% to 60% of the amount of gas that occurs as blast-furnace top gas in the production of pig iron and as converter gas in the converter steel mill is fed to the biotechnological plant.

5. The plant complex according to claim 2, wherein the power-generating plant is used in standby mode and at certain times is switched off.

6. A plant complex for steel production comprising:
a blast furnace for producing pig iron;
a converter steel mill for producing crude steel; and
a gas-conducting system for gases that occur in at least one of the production of pig iron and crude steel;
wherein:
the plant complex additionally comprises:
a chemical plant connected to the gas-conducting system;
chemical or electrochemical energy storage for storing electricity, wherein the stored electricity covers at least part of the electricity demand of the plant complex;
a power-generating plant operably connected to the gas-conducting system;
the chemical plant is arranged in parallel with the power-generating plant with respect to a syngas; and
an electrolysis plant for the electrolysis of water, the electrolysis plant:
being connected to the chemical plant by a hydrogen line; and
being connected to at least one of the blast furnace and the converter steel mill for producing crude steel and treating crude steel by means of an oxygen return device;
wherein:
the chemical plant produces ammonia, methanol, or other hydrocarbon compounds from the syngas;
the syngas consists of a hydrogen gas produced by the electrolysis plant, a blast furnace gas from the blast furnace, a converter gas from the converter steel mill, and a coke oven gas; and
for the purpose of supplying electricity to the electrolysis plant, the energy storage is electrically connected thereto.

7. The plant complex according to claim 6 wherein the power generating plant is designed as a gas-turbine power-generating plant or a gas-turbine and steam-turbine power-generating plant and is operated with a gas which comprises at least a partial amount of one of: the blast-furnace top gas that occurs in the production of pig iron in the blast furnace, and the converter gas that occurs in the converter steel works; and wherein the gas-conducting system has a switchable gas diverter for dividing the streams of gas that are fed to the power-generating plant and the chemical plant.

8. The plant complex according to claim 7, wherein the power-generating plant is used in standby mode and is selectively switched off.

9. The plant complex according to claim 6, wherein oxygen that occurs in the electrolysis of water is used in at least one of the blast furnace for producing pig iron and the converter steel mill for producing crude steel.

10. The plant complex according to claim 9, wherein 5% to 60% of the amount of gas that occurs as blast-furnace top gas in the production of pig iron and as converter gas in the converter steel mill is fed to the chemical plant.

* * * * *